US012758968B2

(12) United States Patent
Salter et al.

(10) Patent No.: US 12,758,968 B2
(45) Date of Patent: Oct. 13, 2026

(54) UNIT DEVICE, METHOD, AND ASSEMBLY

(71) Applicant: Charm Sciences, Inc., Lawrence, MA (US)

(72) Inventors: Robert S Salter, Reading, MA (US); Robert J Markovsky, Brentwood, NH (US); Meikel Brewster, Kingston, NH (US)

(73) Assignee: Charm Sciences, Inc., Lawrence, MA (US)

( * ) Notice: Subject to any disclaimer, the term of this patent is extended or adjusted under 35 U.S.C. 154(b) by 0 days.

(21) Appl. No.: 17/223,211

(22) Filed: Apr. 6, 2021

(65) Prior Publication Data

US 2021/0308667 A1 Oct. 7, 2021

Related U.S. Application Data

(60) Provisional application No. 63/027,461, filed on May 20, 2020, provisional application No. 63/020,168, filed on May 5, 2020, provisional application No. 63/005,862, filed on Apr. 6, 2020.

(51) Int. Cl.
*B01L 3/00* (2006.01)

(52) U.S. Cl.
CPC ....... *B01L 3/5023* (2013.01); *B01L 2200/141* (2013.01); *B01L 2300/042* (2013.01); *B01L 2300/044* (2013.01); *B01L 2300/0609* (2013.01); *B01L 2300/0825* (2013.01)

(58) Field of Classification Search
CPC ............. B01L 3/5023; B01L 2200/141; B01L 2300/042; B01L 2300/044; B01L 2300/0609; B01L 2300/0825; B01L 2300/046; B01L 2300/0663; B01L 2400/0683; B01L 3/5029
See application file for complete search history.

(56) References Cited

U.S. PATENT DOCUMENTS

| | | | | |
|---|---|---|---|---|
| 5,965,453 A * | 10/1999 | Skiffington | C12Q 1/66 | 435/287.7 |
| 2007/0148724 A1* | 6/2007 | Salter | C12Q 1/18 | 435/32 |
| 2007/0206740 A1* | 9/2007 | Iggulden | H04L 67/125 | 379/102.03 |
| 2007/0275475 A1* | 11/2007 | Liang | B01L 3/502 | 422/68.1 |
| 2008/0299648 A1* | 12/2008 | Tomer | G01N 21/78 | 435/287.7 |
| 2009/0004058 A1* | 1/2009 | Liang | B01L 3/502 | 422/68.1 |
| 2012/0094303 A1* | 4/2012 | Engel | G01N 33/54388 | 435/7.1 |

* cited by examiner

*Primary Examiner* — Samuel P Siefke
(74) *Attorney, Agent, or Firm* — MacCord Mason PLLC

(57) ABSTRACT

Sample collection and analysis devices, methods, and assemblies are shown and described. In one embodiment, an assembly includes a sample collection device and a removable vial having a penetrable barrier seal to prevent access to the vial until at least one penetrable activation. The result is improved efficient and effective sample collection and analysis.

13 Claims, 8 Drawing Sheets

UNIT DEVICE, METHOD, AND ASSEMBLY

REFERENCE TO PRIOR APPLICATIONS

This application claims the benefit of U.S. Provisional Application No. 63/005,862, filed Apr. 6, 2020; U.S. Provisional Application No. 63/020,168, filed May 5, 2020; U.S. Provisional Application No. 63/027,461, filed May 20, 2020, all of which are hereby incorporated by reference in their entireties.

FIELD OF THE TECHNOLOGY

The present disclosure relates generally to surface sampling and analysis, and more particularly to improved sample collection and transport devices, methods, and assemblies.

SUMMARY

As shown and described herein, various types of apparatuses helpful to collect and transport a surface sample, for instance any environmental surface sample, to detect a presence, or an absence, of any analyte. Those of ordinary skill in the art having the benefit of this disclosure will recognize that a variety of testing instruments, devices, and systems may be in communication with any of the inventions herein, including, but not limited to, TEST DEVICE, METHOD AND ASSEMBLY (U.S. application Ser. No. 15/434,399); SAMPLING METHOD AND DEVICE (U.S. Pat. No. 7,993,871); METHOD FOR ADJUSTING ANTIBIOTIC SENSITIVITY TO A TEST CULTURE (U.S. Pat. No. 7,897,365); INHIBITION ASSAY METHOD AND DEVICE FOR DETECTION OF ANTIBIOTICS (U.S. Pat. No. 8,476,064); LATERAL FLOW ASSAY ANALYSIS (U.S. application Ser. No. 13/819,064); IMPROVED LUMINOMETER AND CHAMBER (U.S. application Ser. No. 14/154,516); DETECTION SENSOR SYSTEMS AND METHODS (U.S. application Ser. No. 14/207,896); DYNAMIC PLATE READER (U.S. application Ser. No. 14/480,994); LUMINOMETER AND CHAMBER (U.S. application Ser. No. 14/662,825); METHOD AND APPARATUS FOR REDUCING LUMINESCENT TEST RESULT INTERFERENCES (U.S. Pat. No. 8,663,975); RESEALABLE MOISTURE TIGHT CONTAINER (U.S. Pat. No. 9,493,288); Photometer for use with a test sample holder (US Design Pat. No. D393,601), U.S. Pat. Nos. 5,965,453; 5,827,675; 5,985,675; 6,180,395; 6,319,446; 6,475,805; 7,097,983; 7,410,808; 7,785,899; 7,785,899; 7,897,365; 8,481,334; 8,592,171; 8,592,171; 8,592,171; and 9,057,724, any of the useful testing instrument features and elements are incorporated herein by reference.

Those skilled in the art having the benefit of this disclosure will recognize a variety of swab test sample apparatus elements and embodiments useful and compatible with any of the methods and systems shown and described herein.

In one embodiment, an assembly comprises a sample collection device having a handle, a plurality of opposing threads, and a breakable sampling distal probe; and a vial having a penetrable barrier seal, and wherein the breakable sampling distal end comprises a length adapted to be received within the vial.

In certain examples, the vial has a first penetrable barrier seal enclosing a first containment layer. The vial may have a second, or any number of subsequent, penetrable barrier seal(s) enclosing a second containment layer(s). Further, the assembly may include an elongated housing having at least one aperture adjacent a plurality of threads.

In one embedment, an assembly comprises a housing body having at least one aperture adjacent a plurality of threads; a sample collection device removable from the housing and including a handle, a plurality of opposing threads, and a sampling probe; and a vial removable from the housing and having a penetrable barrier seal adapted to prevent access to the vial until at least one penetrable activation, and wherein the assembly may comprise a self-contained assembly to collect and support a surface sample to detect a presence, or an absence, of at least one analyte.

In particular examples, the sampling probe comprises a swab device having a breakable distal sampling end. The sampling probe may include a premoistened tip. The breakable sampling distal end may include a length adapted to be substantially received within the vial. The sample collection device may include a removable cap.

In certain examples, the vial includes a buffer. The buffer may include a deactivation buffer. The buffer may include at least one preservative. The buffer may include a transport medium.

In particular examples, the vial is removable about the sample collection device. The vial may be repositionable within the housing body. The assembly may support sensitive detection, or the like, of at least one analyte.

In certain examples, the assembly includes a lateral flow test strip to communicate with the vial and to detect the at least one analyte, when present, when contacted with the sample. The assembly may collect and support an environmental surface sample. The environmental surface sample may include an orbiting surface. The environmental surface sample may include a moon dust.

In one embodiment, an assembly for analysis of a sample comprises a sample collector removable from a housing; and a vial removable from the housing and having a penetrable barrier seal to receive a portion of the sample collector.

In one embodiment, an assembly comprises a housing body having at least one aperture adjacent a plurality of threads; a sample collection device removable from the housing and having a handle, a plurality of opposing threads, and a sampling probe; and a vial removable from the housing and having a penetrable barrier seal.

In one example, a self-contained assembly collects and transports an environmental surface sample to detect a presence or an absence of any analyte or antigen. The self-contained assembly may preserve the sample for delivery to a laboratory, or the like.

In one example, a self-contained assembly collects and transports an environmental surface sample to detect a presence or an absence of any analyte or antigen, for instance a COVID-19 antigen. The self-contained assembly may preserve the sample for delivery to a laboratory. The sample collection device may include an elongated unit. The sampling probe may include a swab device. The sampling probe may include a polyfoam tip distal sampling end. The sampling probe may include a premoistened tip. The device may include a phosphate buffered saline premoistened tip. The sample collection device may include a removable cap. The sampling probe may include an elongated extractor. The sampling probe may include a breakable sampling distal end. The breakable sampling distal end may include a length adapted to be received within the vial.

In certain examples, the seal may prevent access to the vial until activation. The vial may include a buffer. The buffer may include a viral deactivation buffer. The buffer may include an RNA stabilizing buffer. The buffer may include a BSA buffer. The buffer may include Fetal Bovine Serum. The buffer may include at least one preservative. The buffer may include at least one detergent. The buffer may include a viral transport medium. The buffer may include about 100 μg/mL gentamicin and about 0.5 μg/mL Amphotericin B. The buffer may include about 0.5 milliliters to about 2.5 milliliters. The buffer may include about 0.6 milliliters. The buffer may include about 1.0 milliliters. The buffer may include about 1.4 milliliters. The buffer may include about 2.0 milliliters.

In certain examples, the assembly may include a sample label. The sample collection handle may support the label. The vial may be removable about the sample collection device. The sample collection device a may support sensitive detection of COVID-19 infection. The vial may be repositionable within the housing body. The assembly may include at least one, including a plurality, for instance housed in any of the arrangements shown and described herein, a lateral flow test strip adapted to communicate with the vial and to detect COVID-19 infection, when present, when contacted with the sample.

In one embodiment, an assembly for collection and transport of a sample, the assembly comprises an elongated housing having at least one aperture adjacent a plurality of threads; a sample collection device removable from a proximate portion of the housing and having a handle, a plurality of opposing threads, and a breakable sampling distal probe; and a vial having a penetrable barrier seal supporting a viral deactivation buffer, wherein the vial is removably affixed about the elongated housing in a first position and received within the aperture in a second position.

In certain examples, the self-contained assembly may support sensitive detection of a COVID-19 antigen. For instance, the self-contained assembly may preserve an environmental surface sample for delivery to a laboratory.

In one example, the sampling probe may include a swab device to contact and collect any environmental surface sample. The sampling probe may include a polyfoam tip distal sampling end. The sampling probe may include a premoistened tip. The device may include a phosphate buffered saline premoistened tip. The sample collection device may include a removable cap. The sampling probe may include an elongated extractor. The sampling probe may include a breakable sampling distal end. The breakable sampling distal end may include a length adapted to be received within the vial.

In certain examples, the seal may prevent access to the vial until activation. The vial may include a buffer. The buffer may include a viral deactivation buffer. The buffer may include an RNA stabilizing buffer. The buffer may include a BSA buffer. The buffer may include Fetal Bovine Serum. The buffer may include at least one preservative. The buffer may include at least one detergent. The buffer may include a viral transport medium. The buffer may include about 100 μg/mL gentamicin and about 0.5 μg/mL Amphotericin B. The buffer may include about 0.5 milliliters to about 2.5 milliliters. The buffer may include about 0.6 milliliters. The buffer may include about 1.0 milliliters. The buffer may include about 1.4 milliliters. The buffer may include about 2.0 milliliters.

In certain examples, the assembly may include a sample label. The sample collection handle may support the label. The vial may be removable about the sample collection device. The sample collection device a may support sensitive detection of COVID-19 infection. The vial may be repositionable within the housing body. The assembly may include at least one, including a plurality, for instance housed in any of the arrangements shown and described herein, a lateral flow test strip adapted to communicate with the vial and to detect COVID-19 infection, when present, when contacted with the sample Further, those skilled in the art having the benefit of this disclosure will recognize a variety of useful lateral flow test strip, and similar assay, elements and embodiments useful and compatible with any of the methods and systems shown and described herein.

In one embodiment, an assembly for analysis of a sample comprises a sample collection device having a sampling probe and a vial; and a lateral flow test strip adapted to communicate with the vial, and wherein the test strip comprising a sandwich antibody label complex, a control line upstream or downstream of the antibody label complex, and an active virus test line upstream or downstream of the control line, and wherein the test strip detects immunity and active virus detection, when present, when contacted with the sample.

In one embodiment, an assembly for analysis of a sample comprises a sample collection device having a sampling probe and a vial; and a lateral flow test strip adapted to communicate with the vial, and wherein the test strip comprising a sandwich COVID-19 antibody label complex, a control line downstream of the COVID-19 antibody label complex, and a COVID-19 antigen test line upstream or downstream of the control line, and wherein the test strip adapted to detect COVID-19 immunity and COVID-19, when present, when contacted with the sample.

In one example, the sample collection device includes a housing supporting the sampling probe and a penetrable barrier seal aligned at the vial. The sample collection device may include an elongated test unit. The sampling probe may include a swab device having a handling portion removable about an activator body portion. The swab device may include a removable cap. The removable cap may include opposing threads. The swab device may include an elongated extractor. The swab device may include a sampling distal end. The sampling distal end may include a poly-foam distal sampling end. The swab device may include an activator body portion having a receiving aperture adapted to receive the corresponding swab device. The seal may prevent access to the vial until activation.

In particular examples, the vial includes an extraction buffer. The extraction buffer may include an RNA stabilizing buffer. The extraction buffer may include a BSA buffer. The extraction buffer may include at least one preservative. The extraction buffer may include at least one detergent. The extraction buffer may include about 2% FBS. The extraction buffer may include about 100 μg/mL gentamicin. The extraction buffer may include about 0.5 μg/mL Amphotericin B.

In some examples, the vial may be removable about the sample collection device.

In particular examples, the lateral flow test strip may include a solid backing support. The lateral flow test strip may include a nitrocellulose membrane adhered to the solid backing support. The lateral flow test strip may include an overlay having a transparent tape laminated onto the test strip and adapted to prevent contamination and drive sample flow along the test strip. The overlay may be aligned over the filtration conjugate pad to define an exposed filtration conjugate pad segment and a concealed filtration conjugate pad segment. The overlay may be aligned over substantially half of the filtration conjugate pad.

In some examples, the sample collection device and the lateral flow test strip may be a self-contained testing system having a visible line test result display. The sample collection device and the lateral flow test strip may provide rapid detection of COVID-19 infection, COVID-19 immunity, a combination thereof, and the like active virus indications.

In particular examples, the sample collection device and the lateral flow test strip are housed in a single-use assembly. The antibody label complex in may include an IgM antibody test line having an IgM capture agent immobilized thereon. The visible line development at the IgM antibody test line may indicate an early immune test result. The antibody label complex may include an IgG antibody test line having an IgG capture agent immobilized thereon. The visible line development at the IgG antibody test line may indicate a later immune test result. The antibody label complex may include an IgA antibody test line having an IgA capture agent immobilized thereon. The visible line development at the IgA antibody test line may indicate an early immune test result. The control line may have a capture agent with affinity to the antibody label complex independent of the antibody label complex being bound by respective analytes. The control line may display a valid sample flow.

In some examples, the test strip comprises a receptor binder protein to create a mobile phase admixture when contacted with the sample. The receptor binder protein may include a gold-labeled receptor binder protein. The receptor binder protein may include a spike receptor binder protein. The sample may include a blood sample. The sample may include a nasal swab sample. The sample may include a saliva swab sample.

In particular examples, a darkened intensity visible line development at the COVID-19 antigen test line than compared to the control line indicates a lack of COVID-19 test result. A lightened intensity visible line development at the COVID-19 antigen test line than compared to the control line may indicate a positive COVID-19 test result.

In one embodiment, an assembly for analysis of a sample comprises a sample collection device having a sampling probe and a vial; and a lateral flow test strip adapted to communicate with the vial, and wherein the lateral flow test strip comprises a COVID-19 antibody label complex having a targeted IgM antibody, a targeted IgG antibody, and a targeted IgA antibody; a control line upstream or downstream of the COVID-19 antibody label complex; and a competitive COVID-19 assay for a receptor binding protein, and wherein the test strip adapted to detect COVID-19 immunity and COVID-19, when present, when contacted with the sample.

In particular examples, the sampling probe may include a swab device having a handling portion and a sampling distal end. The vial may include an extraction buffer. The vial may be removable about the sample collection device. The sample collection device and the lateral flow test strip may provide rapid detection of COVID-19 infection and COVID-19 immunity. The sample collection device and the lateral flow test strip may be housed in a single-use assembly. The sample collection device and the lateral flow test strip may be a self-contained testing system having at least one visible line test result display.

In some examples, a visible line development at an IgM antibody test line indicates an early immune test result. The visible line development at an IgG antibody test line may indicate a later immune test result. The visible line development at an IgA antibody test line may indicate an early immune test result. The visible line development at an IgM antibody test line, at an IgG antibody test line, and at an IgA antibody test line may indicate a full immune test result. A darkened intensity visible line development at the competitive COVID-19 assay than compared to the control line may indicate a lack of COVID-19 test result. A lightened intensity visible line development at the competitive COVID-19 assay than compared to the control line indicates a positive COVID-19 test result.

In particular examples, the control line may include a capture agent with affinity to the antibody label complex independent of the antibody label complex being bound by respective analytes. The control line may display a valid sample flow. The test strip may include a receptor binder protein adapted to create a mobile phase admixture when contacted with the sample. The receptor binder protein may include a gold-labeled receptor binder protein. The receptor binder protein may include a spike receptor binder protein.

In one embodiment, a lateral flow test strip for analysis of a sample comprises a receptor binder protein adapted to create a mobile phase admixture when contacted with the sample; an IgM antibody test line having an IgM capture agent immobilized thereon; an IgG antibody test line having an IgG capture agent immobilized thereon; an IgA antibody test line having an IgA capture agent immobilized thereon; a control line having a capture agent immobilized thereon, and upstream or downstream of the IgM, IgG, and IgA antibody test lines; and a COVID-19 antigen test line upstream or downstream of the control line, and wherein the mobile phase admixture adapted to traverse lateral flow through the immunity test lines and the control line to provide a detectable signal, whereby the detectable signal has an intensity provided when at least one analyte receptor is captured by either the immunity test line capture agents or the control line capture agent, and wherein the mobile phase admixture adapted to traverse lateral flow through the control line and the COVID-19 antigen test line to provide a detectable signal, whereby the detectable signal has an intensity provided when the receptor binder protein is captured by either the control line or the COVID-19 antigen test line.

In one example, the lateral flow test strip includes a solid backing support. The lateral flow test strip may include a nitrocellulose membrane adhered to the solid backing support. The lateral flow test strip may include an overlay having a transparent tape laminated onto the test strip and adapted to prevent contamination and drive sample flow along the test strip. The overlay aligned over the filtration conjugate pad may define an exposed filtration conjugate pad segment and a concealed filtration conjugate pad segment. The overlay may include align over substantially half of the filtration conjugate pad.

In particular examples, the lateral flow test strip may provide rapid detection of COVID-19 infection. The lateral flow test strip adapted for rapid detection of COVID-19 immune responses. The lateral flow test strip may be housed in a single-use assembly. The lateral flow test strip may be housed in a blister package substantially enclosing the test strip. The blister package may include a backing bottom surface and an upper blister bubble. A visible line development at the IgM antibody test line may indicates an early immune test result. A visible line development at the IgG antibody test line may indicate a later immune test result. A visible line development at the IgA antibody test line may indicate an early immune test result. A visible line development at the IgM antibody test line, at the IgG antibody test line, and at the IgA antibody test line may indicate a full immune test result.

In some examples, the control line displays a valid sample flow. The receptor binder protein may include a gold-labeled receptor binder protein. The receptor binder protein may include a spike receptor binder protein. The sample may include a blood sample, a nasal swab sample, a saliva swab sample, a combination thereof, and the like.

In particular examples, a darkened intensity visible line development at the COVID-19 antigen test line than compared to the control line indicates a lack of COVID-19 test result. A lightened intensity visible line development at the COVID-19 antigen test line than compared to the control line may indicate a positive COVID-19 test result.

In one embodiment, a lateral flow test strip for analysis of a sample comprises a receptor binder protein adapted to create a mobile phase admixture when contacted with the sample; a COVID-19 antibody label complex; a control line having a capture agent with affinity to the antibody label complex independent of the antibody label complex being bound by respective analytes; and a COVID-19 antigen test line upstream or downstream of the antibody label complex, and wherein the COVID-19 antigen test line adapted to generate a positive control intensity being detectable to signal a valid antibody complex binding result.

In particular examples, the lateral flow test strip may provide rapid detection of COVID-19 infection. The lateral flow test strip may include provide rapid detection of COVID-19 immune responses. The lateral flow test strip may house in a single-use assembly. The lateral flow test strip may be housed in a blister package substantially enclosing the test strip. The blister package may include a backing bottom surface and an upper blister bubble.

In some examples, the antibody label complex includes an IgM antibody test line having an IgM capture agent immobilized thereon. A visible line development at the IgM antibody test line may indicate an early immune test result. The antibody label complex may include an IgG antibody test line having an IgG capture agent immobilized thereon. A visible line development at the IgG antibody test line may indicate a later immune test result. The antibody label complex may include an IgA antibody test line having an IgA capture agent immobilized thereon. A visible line development at the IgA antibody test line may indicate an early immune test result. The control line may display a valid sample flow. The receptor binder protein may include a gold-labeled receptor binder protein. The receptor binder protein comprises a spike receptor binder protein. The sample may include a blood sample, a nasal swab sample, a saliva swab sample, a combination thereof, and the like.

In particular examples, a darkened intensity visible line development at the COVID-19 antigen test line than compared to the control line indicates a lack of COVID-19 test result. A lightened intensity visible line development at the COVID-19 antigen test line than compared to the control line may indicate a positive COVID-19 test result.

In one embodiment, an assembly for analysis of a sample comprises a sample collection device comprising a sampling probe and a vial having a buffer reagent; and a lateral flow test strip adapted to be dipped within the vial, and wherein the test strip comprising a sandwich COVID-19 antibody label complex, a control line downstream of the COVID-19 antibody label complex, and a COVID-19 antigen test line upstream or downstream of the control line, and wherein the buffer reagent stabilizes RNA and enhances lateral flow of the sample along the test strip.

In one example, the sampling probe comprises a swab device having a handling portion and a sampling distal end. The vial may be removable about the sample collection device. The sample collection device and the lateral flow test strip may provide rapid detection of COVID-19 infection. The sample collection device and the lateral flow test strip may provide rapid detection of COVID-19 immunity. The sample collection device and the lateral flow test strip are housed in a single-use assembly.

A visible line development at an IgM antibody test line may indicate an early immune test result. A visible line development at an IgG antibody test line indicates a later immune test result. A visible line development at an IgA antibody test line may indicate an early immune test result. A visible line development at an IgM antibody test line, at an IgG antibody test line, and at an IgA antibody test line may indicate a full immune test result. A darkened intensity visible line development at the competitive COVID-19 assay than compared to the control line may indicate a lack of COVID-19 test result. A lightened intensity visible line development at the competitive COVID-19 assay than compared to the control line may indicate a positive COVID-19 test result.

In particular examples, the control line may display a valid sample flow. The test strip may include a receptor binder protein adapted to create a mobile phase admixture when contacted with the sample. The receptor binder protein may include a gold-labeled receptor binder protein. The receptor binder protein may comprise a spike receptor binder protein.

In one embodiment, an assembly for analysis of a sample comprises a sample collection device having a sampling probe and a vial; and a blister package housing at least one lateral flow test strip, and wherein the test strip comprising a sandwich COVID-19 antibody label complex, a control line downstream of the COVID-19 antibody label complex, and a COVID-19 antigen test line upstream or downstream of the control line, and wherein the test strip adapted to detect COVID-19 immunity and COVID-19, when present, when contacted with the sample.

In certain examples, the sampling probe comprises a swab device having a handling portion and a sampling distal end. The vial may be removable about the sample collection device. The sample collection device and the lateral flow test strip may provide rapid detection of COVID-19 infection and/or rapid detection of COVID-19 immunity. The visible line development at an IgM antibody test line indicates an early immune test result. A visible line development at an IgG antibody test line may indicate a later immune test result. A visible line development at an IgA antibody test line may indicate an early immune test result. A visible line development at an IgM antibody test line, at an IgG antibody test line, and at an IgA antibody test line indicates a full immune test result. Av darkened intensity visible line development at the competitive COVID-19 assay than compared to the control line may indicate a lack of COVID-19 test result. A lightened intensity visible line development at the competitive COVID-19 assay than compared to the control line may indicate a positive COVID-19 test result.

In particular examples, the control line displays a valid sample flow. The test strip comprises a receptor binder protein may create a mobile phase admixture when contacted with the sample. The receptor binder protein comprises a gold-labeled receptor binder protein. The receptor binder protein may include a spike receptor binder protein.

In one embodiment, an assembly for analysis of a sample comprises a sample collection device having a housing supporting a removable sampling distal probe, an adjacent vial comprising a buffer reagent, and a penetrable barrier seal aligned at the vial; and a lateral flow test strip adapted to be dipped within the vial, and wherein the lateral flow test strip comprising a gold-labeled receptor binder protein (RBP) adapted to create a mobile phase admixture when contacted with the sample; an IgM antibody capture agent test line adapted to capture a binder when an IgM binder has not formed an IgM binder-analyte complex; an IgG antibody capture agent test line adapted to capture a binder when an IgG binder has not formed an IgG binder-analyte complex; an IgA antibody capture agent test line adapted to capture a binder when an IgA binder has not formed an IgA binder-analyte complex; a capture agent control line having an IgM antibody adapted to capture the IgM binder, whether or not the IgM binder has formed an IgM binder-analyte complex; an IgG antibody adapted to capture the IgG binder, whether or not the IgG binder has formed an IgG binder-analyte complex; and an IgA antibody adapted to capture the IgA binder, whether or not the IgA binder has formed an IgA binder-analyte complex; and a RBP antibody capture agent test line adapted to capture a binder when a COVID-19 binder has not formed a COVID-19 binder-analyte complex.

In some embodiments, a self-supported assembly is a swab assay system configured to receive a swab sample, deliver the sample to a testing vial, activate and/or hydrate compiled components, and analyze a test strip to generate the test result, including a COVID-19 test result. In alternative embodiments, a swab test sample apparatus mates with a testing instrument, including but not limited to an incubator, to detect any test result as cited herein.

In particular examples, the swab test sample apparatus may be field swab device to receive sample for a source, including a human or animal in a self-supported housing.

Those skilled in the art having the benefit of this disclosure will recognize additional swab test sample apparatus embodiments useful and compatible with any of the methods and systems shown and described herein.

In accordance with the present disclosure, test strips and systems are provided for the analysis of a sample, including but not limited to, lateral flow sandwich assay test strips. This disclosure provides improved lateral flow devices and methods that are convenient, efficient, and safe for the user, particularly when used to detect the presence or absence of COVID-19 in a sample, for instance the visible indication from test and control line development.

Example elements may include a test strip having a solid backing support; a nitrocellulose membrane adhered to the solid backing support and including at least one control area and at least one test area; a filtration conjugate pad having a top side and a fibrous bottom side and aligned to the nitrocellulose membrane at a contact point, and wherein the bottom fibrous side includes a labeled receptor; and an overlay enclosing the nitrocellulose membrane and the contact point between the nitrocellulose membrane and filtration conjugate pad.

Example elements may include an overlay comprising a transparent tape laminated onto the test strip to prevent contamination and drive sample flow along the test strip. For instance, the overlay may be aligned over the filtration conjugate pad to generally define an exposed filtration conjugate pad segment and a concealed filtration conjugate pad segment. For example, the overlay may be aligned over substantially half of the filtration conjugate pad. Further, the overlay may pressurize at least a portion of the test strip to generate an even flow of sample about the test strip.

Example elements may include bead labeled receptors are sprayed to the fibrous bottom of the filtration conjugate pad, and capillary action of the sample traverses sample to the bead labeled receptors. Typically, the capillary action of the sample solubilizes the bead labeled receptors. Advantageously, sample does not contact the bead labeled receptors prior to the capillary action of the sample during travel along the test strip.

Example elements may include a contact point includes an overlap of filtration conjugate pad onto the nitrocellulose membrane. For instance, the contact point includes between about two millimeters to about three millimeters of overlap of filtration conjugate pad onto the nitrocellulose membrane.

Example elements may include a solid support comprises a transparent material for directly viewing a result without equipment. In particular examples, the filtration conjugate pad includes a fiberglass pad or the like. The nitrocellulose membrane may include a plurality of control lines. Similarly, the nitrocellulose membrane may include a plurality of test lines. Further, the labeled receptors may be antibodies conjugated to colloidal gold particles.

In some examples, the method includes comparing intensity of a detectable signal at each of the test line and the control line, wherein a greater intensity of the detectable signal in any one test line as compared to the control line indicates a negative result for a particular analyte and a greater intensity of the detectable signal in the control line compared to any one test line indicates a positive result for the particular analyte, including COVID-19 or the like. In certain embodiments, comparing intensity of the detectable signals includes directly observing the test strip without equipment. Further, the method may include adjusting test sensitivity by adding a mixture of receptors to the test strip.

Yet another embodiment of the disclosure includes an assembly for the analysis of a sample, the assembly may include any of the test strip embodiments and examples shown and described herein and the delivery device embodiments and examples shown and described herein. For instance, the test strip may have a nitrocellulose membrane, a filtration conjugate pad overlapping a portion of the nitrocellulose membrane and including a fibrous bottom side with a sprayed bead labeled receptor, and an overlay tape enclosing the nitrocellulose membrane and a portion of the filtration conjugate pad; and the delivery device may have an elongated body and a receiving distal cavity comprising a surface tension to retain a predetermined volume of the sample during operation.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the disclosure will be better understood by a reading of the Description of Embodiments along with a review of the drawings, in which.

DESCRIPTION OF EMBODIMENTS

Figure 1:
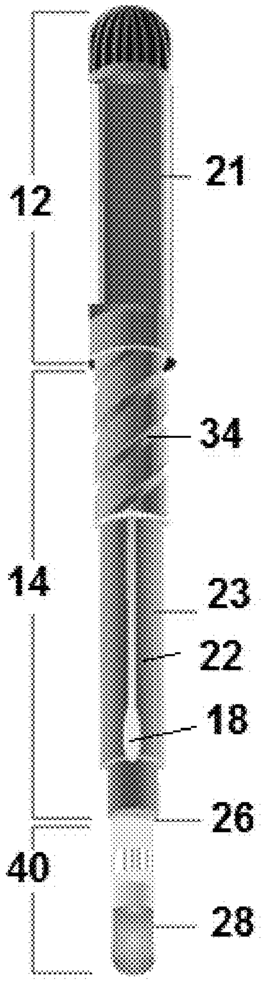
FIG. 1 is a front perspective view of an assembly according to an embodiment of the disclosure.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general, and FIG. 1 in particular, it will be understood that the illustrations are for the purpose of describing embodiments of the disclosure and are not intended to limit the disclosure or any invention thereto. As best seen in FIG. 1, an assembly 10 may include a sample collection device, generally having a sampling probe 12 useful for collecting sample, for instance from an environmental surface sample, or the like, and a corresponding activator body portion 14 to receive the sample collection portion 12. In particular examples, the corresponding activator body portion 14 may include a removable vial 40 housing an extraction buffer 28, wherein the sampling device protrudes through a seal into vial 40 to activate any of the procedures for detection herein.

The self-contained assemblies herein may collect and transport a surface sample 300, for instance any environmental surface sample, to detect a presence, or an absence, of any analyte.

In particular examples, the self-contained assembly collects and transports a surface sample to detect a presence, or an absence, of a viral infection, active virus, or similar viral indication. In particular examples, the self-contained assembly collects and transports an environmental surface sample to detect a presence or an absence of a COVID-19 antigen. Particular embodiments include the detection of COVID-19 infection/antigen and COVID-19 immune responses/antibodies in a sample, and those skilled in the art having the benefit of this disclosure will recognize useful elements and nomenclature from http://www.centerforhealthsecurity.org/resources/COVID-19/200228-Serology-testing-COVID.pdf, which is incorporated by reference in its entirety.

The self-contained assemblies herein may collect and transport any surface sample, for instance any orbiting, non-earth surface, and the like surface shown and described herein, to detect a presence, or an absence, of any analyte. For instance, in particular examples, the sampling surface may be a surface beyond the earth, for instance any orbiting surface, including, but not limited to, space stations, vehicles, planets, moons, or other surfaces. Particular embodiments include sampling of space station surfaces, for instance the international space station, and the like, and those skilled in the art having the benefit of this disclosure will recognize useful elements and nomenclature from https://www.nasa.gov/mission_pages/station/main/index-.html, which is incorporated by reference in its entirety.

In any of the embodiments and examples herein, the self-contained assembly preserves the sample for delivery to a laboratory, or the like. In certain examples, any of the test strips 100 herein may communicate, including, but not limited to, dipped, partially submerged, and in certain alternative examples fully submerged, or the like into vial 40, or similar sample delivery device, to enhance immediate testing efficiency and minimize contamination.

Particular examples include the detection of COVID-19 infection/antigen and COVID-19 immune responses/antibodies in a sample, and those skilled in the art having the benefit of this disclosure will recognize useful elements and nomenclature from http://www.centerforhealthsecurity.org/resources/COVID-19/200228-Serology-testing-COVID.pdf, which is incorporated by reference in its entirety.

In particular examples, the vial 40 houses an extraction buffer 28 useful for detection of an analyte, for instance, but not limited to, COVID-19 infection and COVID-19 immune responses, and the like. Additional embodiments include buffer 28 housed in the sampling probe 12, or similar locations in the sample collection device, to enhance flow, for instance by blocking binding sites on the test strip as shown and described herein. In particular examples, the vial 40 includes an extraction buffer 28. The extraction buffer 28 may include an RNA stabilizing buffer, including a RNA lysis buffer. The extraction buffer 28 may include a BSA buffer. The extraction buffer 28 may include at least one preservative. The extraction buffer 28 may include at least one detergent. The extraction buffer 28 may include about 2% FBS. The extraction buffer 28 may include about 100 μg/mL gentamicin. The extraction buffer 28 may include about 0.5 g/mL Amphotericin B.

In certain examples, the seal 26 may prevent access to vial 40 until activation. The buffer may include any deactivation buffer, for instance, but not limited to, a viral deactivation buffer. The buffer may include an RNA stabilizing buffer. The buffer may include a BSA buffer. The buffer may include Fetal Bovine Serum. The buffer may include at least one preservative. The buffer may include at least one detergent. The buffer may include a viral transport medium. The buffer may include about 100 μg/mL gentamicin and about 0.5 μg/mL Amphotericin B. The buffer may include about 0.5 milliliters to about 2.5 milliliters. The buffer may include about 0.6 milliliters. The buffer may include about 1.0 milliliters. The buffer may include about 1.4 milliliters. The buffer may include about 2.0 milliliters. Those skilled in the art having the benefit of this disclosure will recognize additional useful buffers in the vial 40 and sample collection device, or a combination thereof.

In one embodiment, a sample label identity 21 is secured on the assembly, for instance about the sample collection handle 12 along the housing cap. The sample collection device 12 may be pulled apart from housing 14, thereby presenting a prewetted swab tip 18 for surface 300 wiping, i.e. any of the sample collection shown and described herein. The sample collection device 12 may be reassembled about housing 14 to protrude the sample containing tip 18' through seal 26 into vial 40. The vial 40 may contain any of the buffer 28 embodiments and examples shown and described herein. The vial 40 may be removed from housing 14 and secured about opposing threads of the sample collection device into any of the second positions shown and described herein. In certain examples, the self-contained assembly may be transported to a laboratory for testing, including, but not limited to sensitive PCR testing and the like. While in alternative examples, the self-contained assembly may include a test strip for immediate test analysis as shown and described in any of the procedures herein.

In one example of operation, a user (including, but not limited to, a untrained end user for remote/home testing)

separates the sampling device, for instance swab device 12, from the activator body portion 14. The swab device 12 may swab, or similarly engage, the nose, throat, mouth, blood, a combination thereof, or like anatomical region or direct sampling. For instance, a polyfoam distal end 18 may swab a patient's nose, mouth, blood, combination, or the like. The swab device 12 may be reinserted into the activator body portion 14, thereby hydrating and activating testing. For instance, the polyfoam distal end 18 may puncture a seal 26 and enter a portion having an extraction buffer 28 to rehydrate reagents for testing and enhance flow along any of the test strips shown and described herein. The user may retrieve the swab device 12 and shake all liquid into a testing chamber, for instance vial 40 or the like. In particular examples, vial 40 may be removed from the assembly, for instance to incubate, or the like, the vial 40. Some embodiments and examples include no incubation. A test strip 100, for instance supporting a combination of the sandwich assay and competitive assay introduced in FIG. 1A, may be dipped, added to the vial 40, or similarly exposed to the reagents in the vial 40, to develop any of the tests shown and described herein, including, but not limited to, the detection of COVID-19 infection and COVID-19 immune responses/antibodies, or the like.

As shown, any of the test strips 100, including lateral flow test strips, detect one or more substances (any single or multiple analyte(s), COVID-19 antigen/infection, COVID-19 immune responses/antibodies, and the like) in a sample, including the sample admixture generated in vial 40 or the like. Typically, an end of test strip 100 supporting a receptor binder protein 16, or fragment thereof, is dipped directly into a sample admixture, for instance into sample containing buffer in vial 40, to create a mobile phase admixture, wherein the liquid sample begins traveling toward the other end of the test strip. If an analyte is present within the sample, it will bind to a labeled receptor as described in any of the varying embodiments and examples herein. Depending on the concentration of analytes within the sample, a portion of labeled receptor may remain unbound yet continue to travel along with the rest of the mobile phase. As the mobile phase flows from one end to the other, at least a portion of unbound labeled receptors will be captured at any of the test lines/zones shown and described herein. The remaining bound and unbound labeled receptors will be captured at any of the test control lines/zones and/or test line 32 shown and described herein, and presence of analytes can be determined by comparing signal intensities between a test zone and a control zone. A higher intensity at a test zone generally indicates a negative result (i.e., absence of analyte) whereas a higher intensity at a control zone indicates a positive result (i.e., presence of analyte).

Figure 1A:
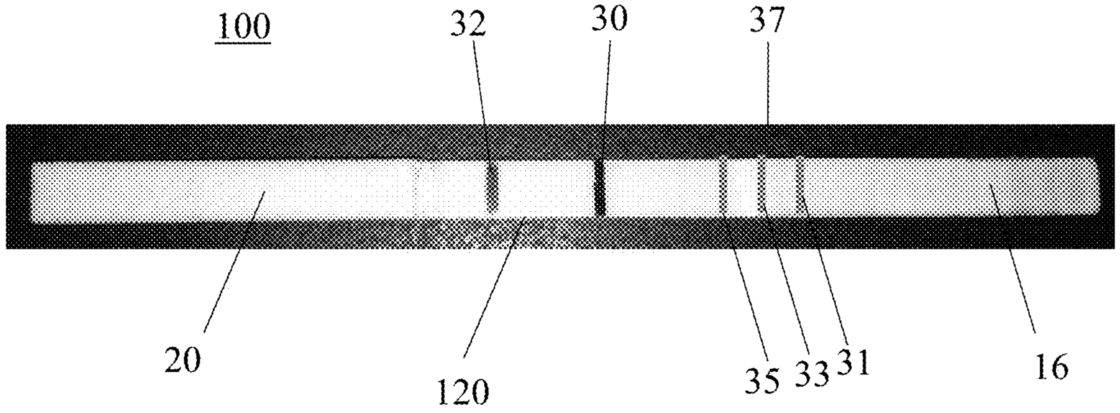
FIG. 1A is an overhead view of useful test strip components introduced in the embodiment of FIG. 1, according to an embodiment of the disclosure.

As introduced in FIG. 1A, solid support 120 provides a structural foundation for test strip 100 wherein any of the various strip components shown and described herein may be attached. Solid support 120 may be comprised of any combination of plastics, such as polystyrene. In one example, solid support 120 is a transparent plastic material which may be useful for visually observing results by reading the transmission easily on the upper surface of test strip 100 rather than measuring the reflectance on the top of test strip 100.

A membrane, for instance a nitrocellulose membrane, may be adhered to at least one side of solid support 120. Nitrocellulose membrane may enable the mobile phase to flow from one end of test strip 100 towards the direction of the opposing end. In particular examples, nitrocellulose membrane includes any of the beads and elements shown and described herein, and the membrane containing the beads may be pretreated with a blocking solution. The blocking solution may dissolve when the diluted sample is added to the apparatus. Similarly, the nitrocellulose membrane can also be pretreated and/or blocked.

In certain examples, the lateral flow test strip 100 may include an overlay having a transparent tape laminated onto the test strip 100 to prevent contamination and drive sample flow along test strip 100. The overlay may be aligned over a filtration conjugate pad, for instance to define an exposed filtration conjugate pad segment and a concealed filtration conjugate pad segment. The overlay may align over substantially half, or the like, of a filtration conjugate pad.

Embodiments of lateral flow test strips 100 support a variety of antibody label complexes and test line/control line arrangements.

Figure 1B:
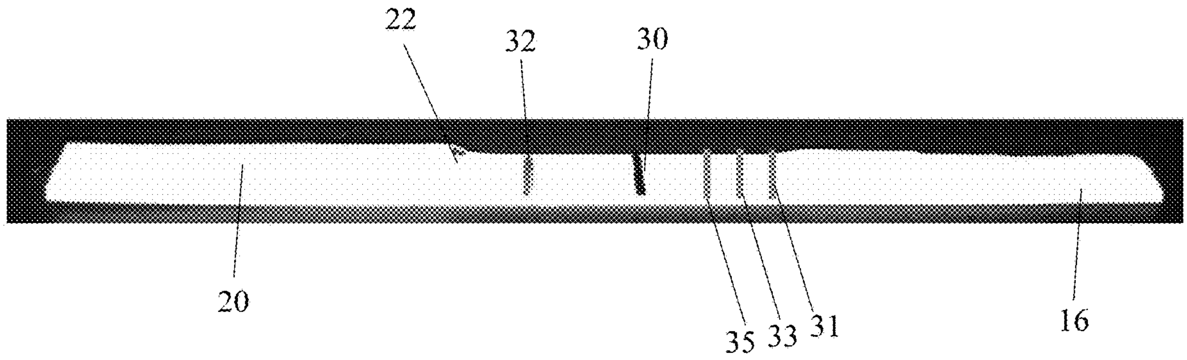
FIG. 1B is a side view of useful test strip components according to FIG. 1A, assembled according to one example of the disclosure.
Figure 1C:
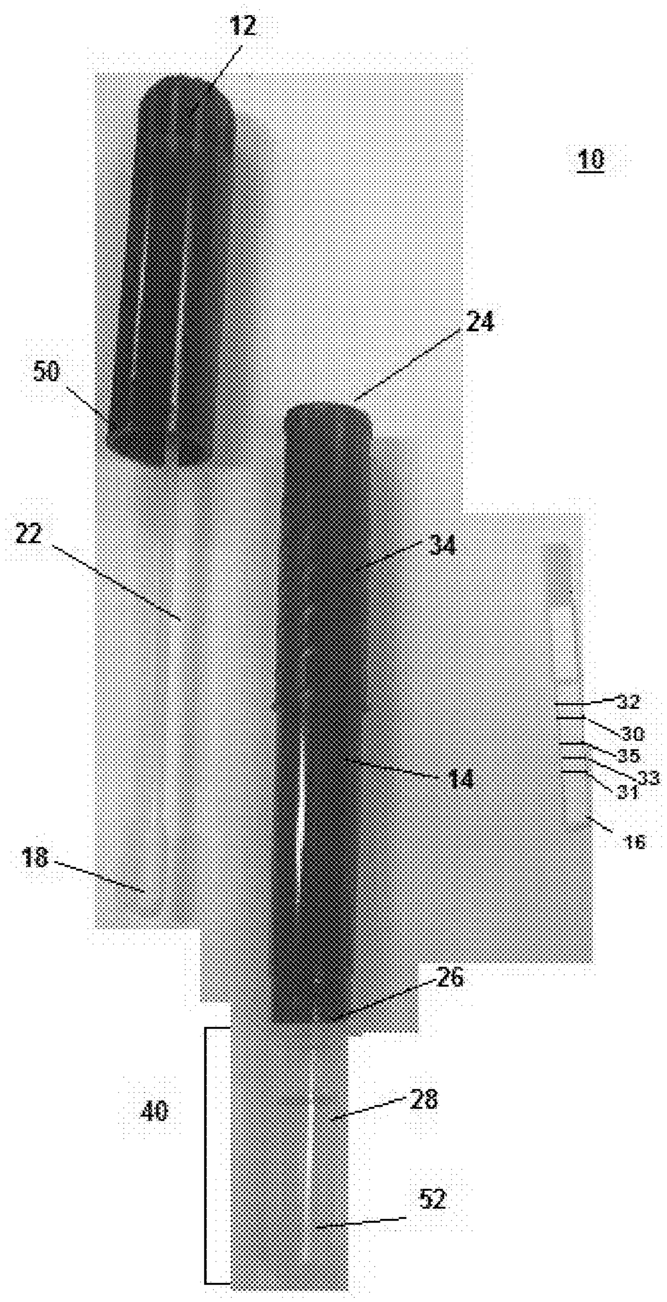
FIG. 1C is a partially exploded view of an assembly according to an embodiment of the disclosure.
Figure 1D:
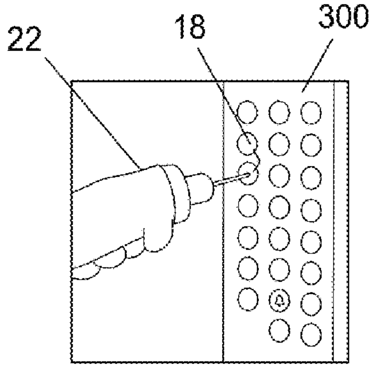
FIG. 1D-1G illustrate perspective views of useful steps in a method according to an embodiment of the disclosure.
Figure 1E:
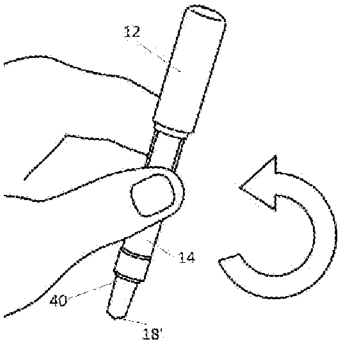
Figure 1F:
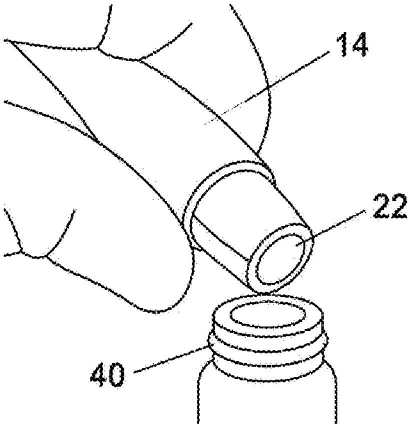
Figure 1G:
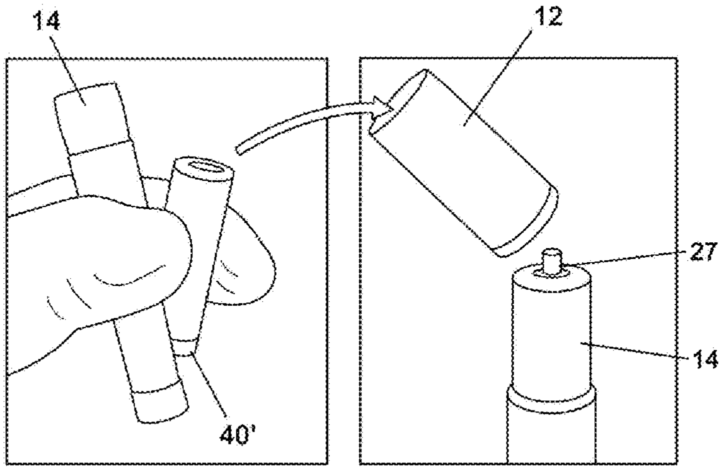

As shown in FIG. 1A, one example includes a lateral flow test strip 100 having a combined COVID-19 antibody sandwich assay and a COVID-19 infection, active virus, competitive assay supported in a single use application to provide a full immunity and active virus test result. As illustrated, on a sample application area the test strip 100 may support a receptor binder protein 16 to create a mobile phase admixture when contacted with sample. Downstream of the receptor binder protein 16 may be the COVID-19 antibody label complex. As illustrated in FIGS. 1A and 1B, one example of the COVID-19 antibody label complex 37 includes three test lines/areas for the IgM antibody test, the IgG antibody test, and the IgA antibody test. For instance, an IgM antibody test line 31 may have an IgM capture agent immobilized thereon; the IgG antibody test line 33 may have an IgG capture agent immobilized thereon; and the IgA antibody test line 35 may have an IgA capture agent immobilized thereon. Those skilled in the art having the benefit of this disclosure will recognize additional useful COVID-19 antibody label complex combinations and arrangements supported on the test strip 100.

As further shown in FIGS. 1A and 1B, a control line 30 may have a capture agent immobilized thereon. In particular examples, the control line 30 is aligned downstream of the IgM, IgG, and IgA antibody test lines 31, 33,35. As illustrated, a COVID-19 infection/antigen test line 32 may be aligned, including in certain examples upstream or downstream, of control line 30. In particular examples, the mobile phase admixture traverses lateral flow through immunity test lines 31, 33,35 and the control line 30 to provide a detectable signal. The detectable signal may have an intensity provided when at least one analyte receptor is captured by either the immunity test line capture agents at test lines 31, 33,35 or by control line capture agent at control line 30 to provide any of the immunity detections and test result shown and described herein. Further, the mobile phase admixture may traverse lateral flow through control line 30 and COVID-19 antigen test line 32 to provide a detectable signal. The detectable signal may have an intensity provided when the receptor binder protein is captured by either control line 30 or by COVID-19 antigen test line 32 to provide any of the active virus detections and test result shown and described herein.

Figure 2:
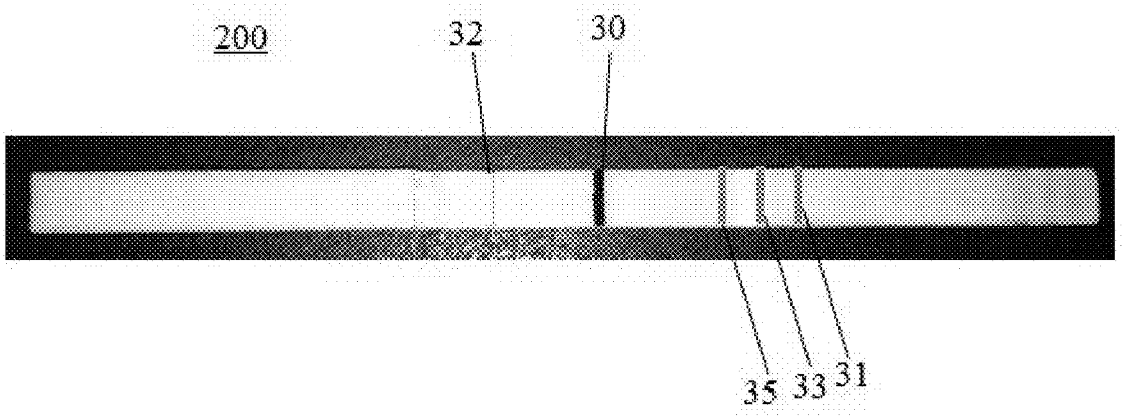
FIG. 2 is an overhead view introduced in FIG. 1A, illustrating one embodiment of a response result.
Figure 3:
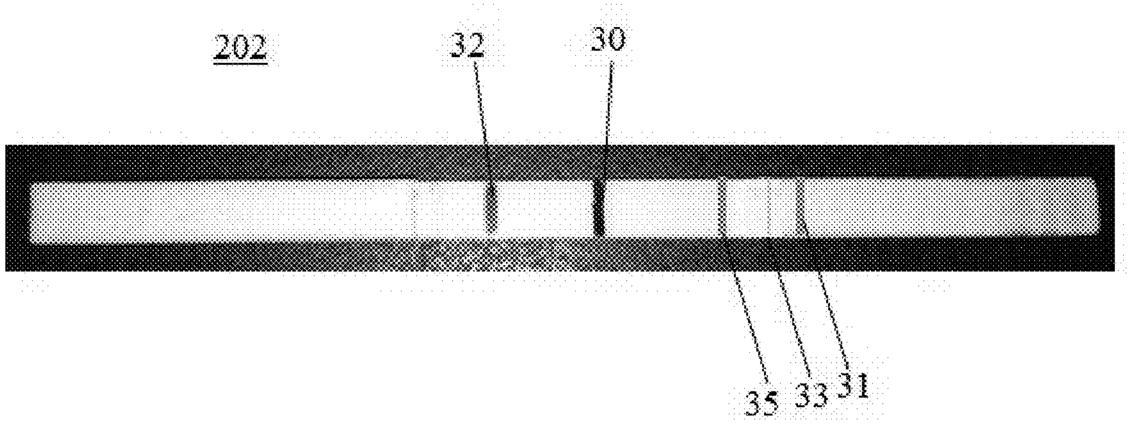
FIG. 3 is an overhead view introduced in FIG. 1A, illustrating one embodiment of a response result.
Figure 4:
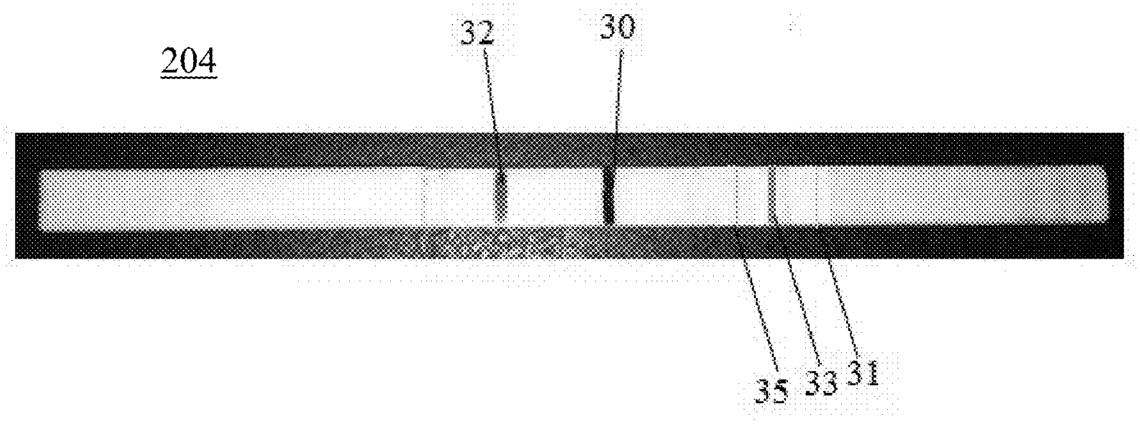
FIG. 4 is an overhead view introduced in FIG. 1A, illustrating one embodiment of a response result.

In some examples, the visible line development at an IgM antibody test line 31 indicates an early immune response result 202 (as illustrated in FIG. 3). The visible line development at an IgG antibody test line 33 may indicate a later immune response result 204 (as illustrate in FIG. 4). The visible line development at an IgA antibody test line 35 may indicate an, early or later, oral/respiratory immune response result 202 (as illustrated in FIG. 3). The visible line development at an IgM antibody test line 31, at an IgG antibody test line 33, and at an IgA antibody test line 35 may indicate a fully developed later stage immune response test result 200 (as illustrated in FIG. 2).

Figure 5:
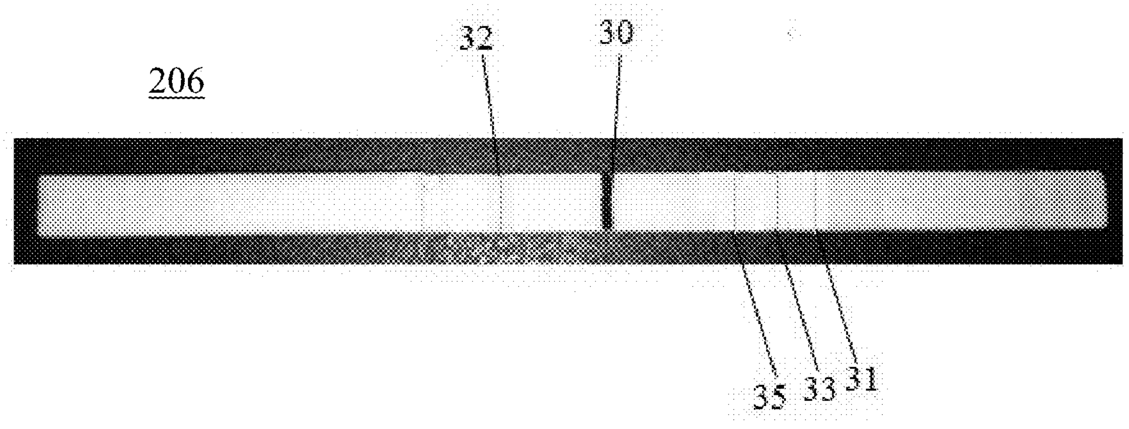
FIG. 5 is an overhead view introduced in FIG. 1A, illustrating one embodiment of a response result.

In some examples, a darkened intensity visible line development at competitive COVID-19 antigen test line 32 than compared to control line 30 may indicate a lack of COVID-19 test result. Whereas a lightened intensity visible line development at competitive COVID-19 antigen test line 32 than compared to control line 30 indicates a positive COVID-19 test result, for instance of a COVID-19 active infection 206 (as illustrated in FIG. 5). Those skilled in the art having the benefit of this disclosure will recognize additional useful visible line development deployments, including but not limited to no line development, weak line development, or the like, for the various COVID-19 antibody and infection detections for visible, electronic, or otherwise display and the like.

Applicant has unexpectedly discovered the COVID-19 infection/antigen test line 32 also serves to generate a positive control, i.e. via a detectable line/zone intensity, to signal a valid antibody complex binding result. Further, Applicant has unexpectedly discovered the control line 30 may display a valid sample flow of the test strip, i.e. proper lateral flow delivery of mobile phase admixtures and the like along the test strip.

In one embodiment, an assembly 10 for analysis of a sample comprises a sample collection device having a sampling probe 12 and a vial 40; and a lateral flow test strip 100 to communicate with vial 40, and wherein test strip 100 comprising a sandwich COVID-19 antibody label complex 37, a control line 30 downstream of the COVID-19 antibody label complex 37, and a COVID-19 antigen test line 32, upstream or downstream, of control line 30. The test strip 100 detects COVID-19 antibodies and COVID-19 infection/antigen, when present, when contacted with sample.

In one example, the sample collection device includes a housing 34 supporting a sampling probe 12 and a penetrable barrier seal 26 aligned at vial 40. The sample collection device may include an elongated test unit. The sampling probe may include a swab device 12 having a handling portion removable about activator body portion 14. The swab device may include a removable cap. The removable cap may include opposing threads. The swab device may include an elongated extractor 22. The swab device may include a sampling distal end 18. The sampling distal end may include a poly-foam distal sampling end. The swab device may include an activator body portion having a receiving aperture 24 adapted to re-receive swab device 12 after collecting a sample. The seal may prevent access to vial 40 until activation.

Additionally, those of ordinary skill will recognize additional sample applications, including but not limited to diluting solid, semi-solid samples and the like. In certain examples, as the liquid sample makes contact with filtration conjugate pad, the sample and accompanying analytes (if present) begins flowing toward the other end of the test strip through any of the elements shown and described herein, including but not limited to via capillary action. The sample then mixes with labeled receptors as the mobile phase traverses through filtration conjugate pad. Labeled receptors include a label, an analyte binding site, and a secondary binding site. In certain examples, if an analyte is present within the sample, it will bind to a labeled receptor at the analyte binding site to form an analyte-receptor complex. Depending on the concentration of analytes within the liquid sample, a portion of labeled receptor may remain unbound yet continue to travel along with the rest of the mobile phase. The mobile phase continues to flow toward the stationary phase of membrane.

In one embodiment, an assembly for analysis of a sample comprises a sample collection device having a sampling probe and a vial; and a lateral flow test strip adapted to communicate with the vial, and wherein the test strip comprising a sandwich COVID-19 antibody label complex, a control line downstream of the COVID-19 antibody label complex, and a COVID-19 antigen test line upstream or downstream of the control line, and wherein the test strip adapted to detect COVID-19 immunity and COVID-19, when present, when contacted with the sample.

In certain examples, at least a portion of unbound labeled receptors are captured by test zone capture agents at one or more test zones within membrane. Capture agents at test zone are characterized by their greater affinity toward labeled receptor as opposed to analyte-receptor complexes. Bound and unbound labeled receptors that are not captured by test zones may be captured by capture agents at one or more control zones located closer toward the opposing end of the application end. The binding affinities for the labeled receptor as well as the analyte-receptor complex are equivalent for the capture agents at control zone.

The remaining mobile phase, including all bound and unbound labeled receptors not captured at either test zone or control zone. In alternative examples, the mobile phase may be absorbed by absorbent sponge. Depending on the label conjugated to the receptors, presence of analytes may be determined by directly comparing signal intensities between test zones and control zones with no additional equipment needed to observe the signals. In some examples, additional equipment may be used to conduct assays. For instance, an incubator may be used to control and/or stabilize the temperature where applicable.

A higher intensity at a test zone generally indicates a negative result (i.e., absence of analyte) whereas a higher intensity at a control zone indicates a positive result (i.e., presence of analyte). In some examples, a false negative result may be caused by low sensitivity or low concentration of analyte. Similarly, a false positive result may be caused by oversensitive or unspecific binding to substances within the sample. Test sensitivity may be further adjusted by adding a mixture of additional receptors to the test strip.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size, and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

We claim:

1. A system comprising:

a. a housing body having at least one aperture;

b. a sample collection device removably couplable to said housing;

c. a sampling probe having a breakable sampling distal portion including a predefined weakened region forming a breaking location adapted to be separated along said defined breaking location and collect and retain a surface sample;

d. a vial aligned in said housing in a first, sealed position and adapted to be separated from said housing to a second removed position, and having a penetrable barrier seal disposed at an entry region of the vial and preventing access to contents of said vial until at least one physical penetration of said breakable sampling distal portion of said probe, and wherein said vial comprises a buffer solution enclosed beneath said penetrable barrier seal and wherein said breakable sampling distal portion is received within said vial after penetration of said barrier seal; and e. a lateral flow test strip packaged separately from said vial within said system and removable from said sealed compartment and manually introducible into said vial only after said vial is in said second removed position, and wherein said lateral flow strip having at least one control line and at least one test line configured to undergo a detectable change when exposed to an analyte contained in said surface sample, when said analyte is present, within said removed vial, and wherein said system is adapted such that, upon penetration of said barrier seal by said breakable distal sampling portion and mixing with a reagent, said test strip when introduced into said vial develops a result indicative of a presence or absence of at least one said analyte in said second removed position, and wherein said system constitutes a single-use, self-contained assembly including said sample collection device, said vial, and said packaged lateral flow test strip, collectively supporting sample collection, transport, and analyte detection in said removed second position.

2. The system of claim 1, wherein said sampling probe comprises a premoistened tip.

3. The system of claim 1, wherein said breakable sampling distal end comprises a predetermined length adapted to be substantially received within said vial after penetration of said barrier seal.

4. The system of claim 1, wherein said sample collection device includes a removable cap.

5. The system of claim 1, wherein said buffer comprises a deactivation buffer.

6. The system of claim 1, wherein said buffer includes at least one preservative.

7. The system of claim 1, wherein said buffer includes a transport medium.

8. The system of claim 1, wherein said vial being removable about said sample collection device to a second position for analyte testing.

9. The system of claim 1, wherein said vial being repositionable within said housing body.

10. The system of claim 1, wherein said assembly adapted to support sensitive detection of at least one analyte selected from a viral antigen, viral antibody, toxin, antibiotic, or small molecule.

11. The system of claim 1, wherein said assembly adapted to collect and support an environmental surface sample.

12. The system of claim 11, wherein said environmental surface sample comprising an orbiting surface.

13. The system of claim 11, wherein said environmental surface sample comprising a moon dust.

* * * * *